US009834155B2

(12) United States Patent
Gong

(10) Patent No.: US 9,834,155 B2
(45) Date of Patent: Dec. 5, 2017

(54) RADAR TRANSPARENT VEHICLE EMBLEM WITH MULTI-COLOR, MULTI-DIMENSIONAL A-SURFACE

(71) Applicant: GM GLOBAL TECHNOLOGY OPERATIONS LLC, Detroit, MI (US)

(72) Inventor: Kitty L. Gong, Macomb, MI (US)

(73) Assignee: GM Global Technology Operations LLC, Detroit, MI (US)

(*) Notice: Subject to any disclaimer, the term of this patent is extended or adjusted under 35 U.S.C. 154(b) by 51 days.

(21) Appl. No.: 15/065,218

(22) Filed: Mar. 9, 2016

(65) Prior Publication Data

US 2017/0259754 A1 Sep. 14, 2017

(51) Int. Cl.
| | |
|---|---|
| *B60R 13/00* | (2006.01) |
| *B62D 25/12* | (2006.01) |
| *G09F 21/04* | (2006.01) |
| *B29C 69/02* | (2006.01) |
| *B60R 19/52* | (2006.01) |
| *B29K 69/00* | (2006.01) |
| *B29K 67/00* | (2006.01) |
| *B29L 9/00* | (2006.01) |
| *B29L 31/30* | (2006.01) |

(52) U.S. Cl.
CPC ............ *B60R 13/005* (2013.01); *B29C 69/02* (2013.01); *B62D 25/12* (2013.01); *G09F 21/048* (2013.01); *B29K 2067/003* (2013.01); *B29K 2069/00* (2013.01); *B29L 2009/00* (2013.01); *B29L 2031/3005* (2013.01); *B60R 2019/525* (2013.01)

(58) Field of Classification Search
CPC ..... B60R 13/005; B60R 13/04; B60R 19/023; B60R 19/483; B60R 21/013; B60R 21/0134; B62D 25/12

USPC .......................................................... 296/1.08
See application file for complete search history.

(56) References Cited

U.S. PATENT DOCUMENTS

| | | | |
|---|---|---|---|
| 7,990,334 B2 * | 8/2011 | Maeda | B29C 45/1671 343/711 |
| 8,266,833 B2 | 9/2012 | Pierce et al. | |
| 8,372,493 B2 | 2/2013 | Greve | |
| 8,702,135 B2 | 4/2014 | Gaboury et al. | |
| 9,533,627 B2 * | 1/2017 | Sugiura | B44C 5/0415 |
| 2003/0052810 A1 | 3/2003 | Artis et al. | |

(Continued)

FOREIGN PATENT DOCUMENTS

JP 2012112660 A * 6/2012

*Primary Examiner* — Jason S Daniels
(74) *Attorney, Agent, or Firm* — Quinn IP Law

(57) ABSTRACT

Disclosed herein are vehicle emblems, automobiles with vehicle emblems, and methods of manufacturing vehicle emblems. A vehicle emblem for an automobile includes a bezel for mounting the emblem to the automobile's vehicle structure, such as the front grille, engine hood, or outer fascia panel. A rigid backing is seated within and attached to the bezel. The rigid backing includes one or more depressions and/or one or more ribs. A cover sheet lays against and is attached to the front-surface of the backing. The cover sheet includes a transparent layer or film with a multi-color print. The cover sheet includes one or more depressions and/or one or more ribs that are formed in the transparent layer. Each of the cover sheet's depressions is seated inside one of the rigid backing's depressions, while each of the rigid backing's ribs is seated inside one of the cover sheet's ribs.

20 Claims, 2 Drawing Sheets

(56) References Cited

U.S. PATENT DOCUMENTS

| | | | |
|---|---|---|---|
| 2004/0125023 A1* | 7/2004 | Fujii | B29C 45/1671 343/700 MS |
| 2007/0210979 A1 | 9/2007 | Shingyoji | |
| 2012/0119961 A1* | 5/2012 | Mayer Pujadas | B60R 13/005 343/713 |
| 2013/0177729 A1* | 7/2013 | Ostrander | B29C 45/14336 428/68 |
| 2015/0076851 A1* | 3/2015 | Sugiura | B60R 13/005 296/1.08 |
| 2015/0140259 A1* | 5/2015 | Sugiura | B32B 3/30 428/72 |
| 2017/0057424 A1* | 3/2017 | Yamada | B60R 13/005 |

* cited by examiner

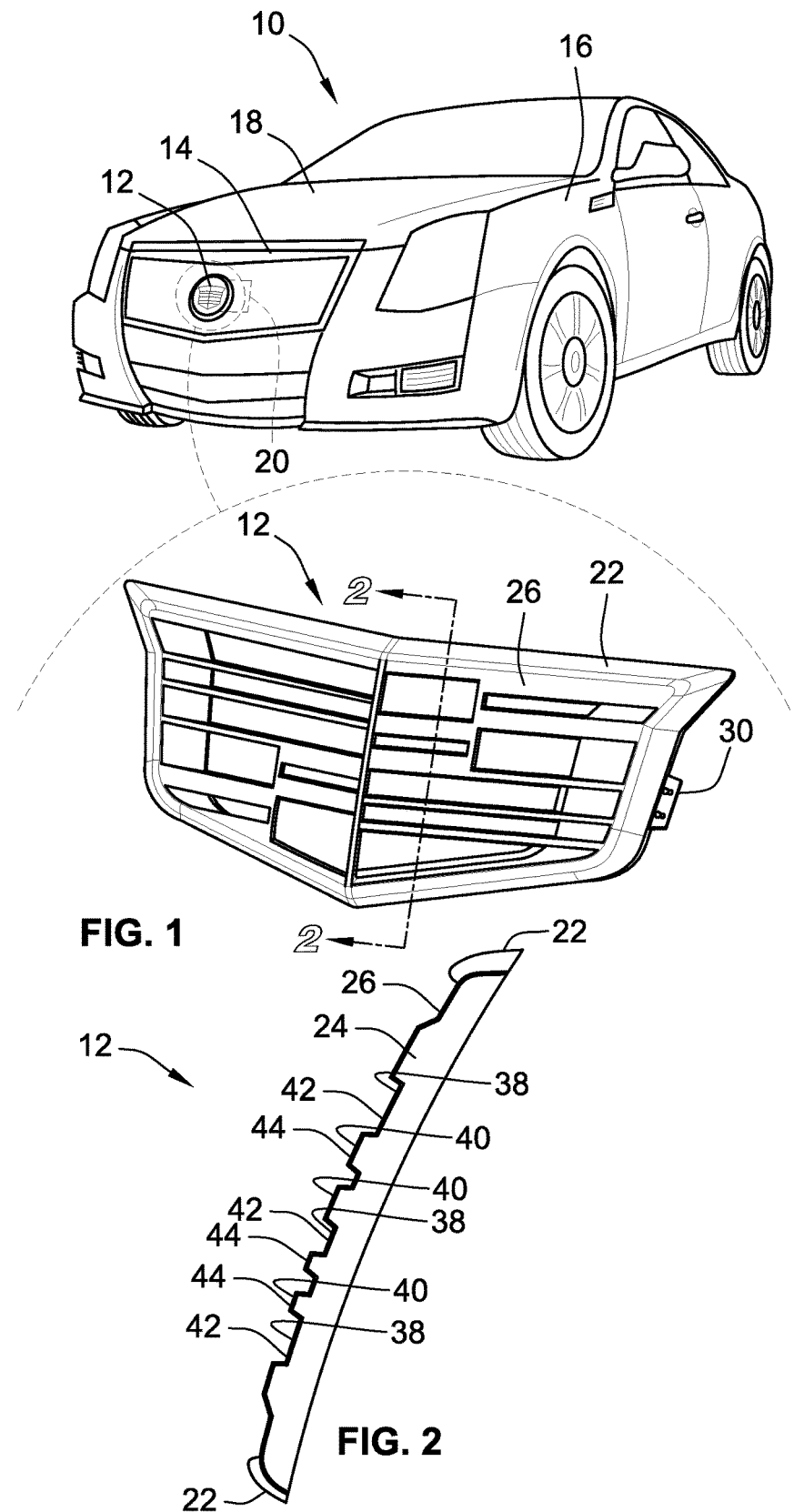

RADAR TRANSPARENT VEHICLE EMBLEM WITH MULTI-COLOR, MULTI-DIMENSIONAL A-SURFACE

TECHNICAL FIELD

The present disclosure relates generally to nameplates, badges, and other graphical media for motor vehicles. More specifically, aspects of this disclosure relate to externally mounted vehicle emblems with radar transparent characteristics.

BACKGROUND

Graphical media, such as nameplates, plaques, appliques, decals, badges, etc., are used to decorate, identify, and/or describe many commercial products. The automotive industry uses vehicle emblems, including grille badges and boot badges, to designate the make and model and, in some instances, the version of a vehicle. Vehicle emblems are normally secured to a forward portion of the engine hood ("hood badge"), mounted on the front grille ("grille badge"), or coupled to a lateral panel ("side badge") or a rear panel ("bumper badge") of the vehicle's outer fascia. While most vehicle emblems are limited to providing information and an aesthetically appealing ornamental design, some emblem configurations provide additional functionality, including occupant protection, anti-theft, and other features.

Adaptive Cruise Control (ACC; also designated Autonomous Cruise Control) is a computer-automated vehicle control system used to regulate vehicle speed, for example, to manage the distance from vehicles forward of the automobile's passenger compartment while maintaining the driver's preset cruise control speed. Another type of automated vehicle control system is the Collision Avoidance System (CAS), which detects imminent collision conditions and either provides a warning to the driver or takes action autonomously—e.g., by steering or braking—without driver input. Intelligent Parking Assist Systems (IPAS), Lane Monitoring Systems, and other autonomous car-maneuvering features are also available on modern-day automobiles.

For all of the above-mentioned computer-automated systems, vehicle control is typically imposed based on sensor information from on-board laser, infrared, video or radar sensors. By way of example, many ACC and CAS systems use front-mounted radar sensors for determining the distance to a vehicle forward of the passenger compartment, as well as its relative speed, and, if required, the directional angle of the front vehicle. Radar sensor systems emit and receive electromagnetic radio waves, which have low penetration capabilities with respect to the metallic, chrome, and polymeric materials commonly used to fabricate automotive emblems and badges. If the badge is mounted in such a way that it intercepts emitted/received radar beams, the badge can obstruct or otherwise attenuate the radio waves and thereby disturb the ACC system.

SUMMARY

Disclosed herein are vehicle emblems, vehicles with such emblems, and methods of manufacturing and methods of using vehicle emblems. Some of the disclosed concepts are directed to a radar-transparent jewel-like grille badge with a multi-colored and multi-dimensional forward-most show surface (also referred to as "A-surface" in the automotive industry). The grille badge may be part of an active vehicle control system in which radar signals are transmitted through the emblem without significant radar attenuation. There are many factors which contribute to radar attenuation, including badge material, thickness, placement angle, etc. In order to minimize ACC system radar signal loss through an emblem, previous designs have been limited to even-thickness "smooth" assemblies and flat A-surface designs. Some use lenses with an encapsulated three-dimensional (3D) image while others incorporate lenses with a two-dimensional (2D) printed logo, both of which maintain a smooth A-surface with a constant assembly thickness to ensure radar signal transmission. The jewel-like grille badge, in contrast, enhances the emblems appearance by bringing multi-dimensional styling features to the show surface, including a full-color digitally printed logo, while minimizing radar attenuation through predetermined surface criteria.

Aspects of the present disclosure are directed to vehicle emblems for motor vehicles. For example, a vehicle emblem includes a bezel that is configured to mount the vehicle emblem assembly to an automobile's vehicle structure. A rigid backing is seated within and attached to the bezel. This rigid backing includes one or more backing depressions and/or one or more backing ribs. A cover sheet lays against and is attached to the rigid backing—the sheet-and-backing unit also referred to herein as a "lens." The cover sheet includes a transparent layer with a color print on the transparent layer. One or more sheet depressions and/or one or more sheet ribs are formed in the transparent layer of the cover sheet. Each sheet depression is seated inside at least one of the backing depressions, and each backing rib is seated inside at least one of the sheet ribs.

According to other aspects of the present disclosure, motor vehicles with a vehicle emblem are presented. The motor vehicle may include any relevant platform, such as passenger vehicles (including internal combustion (IC), hybrid, electric, etc.), industrial vehicles, buses, all-terrain vehicles (ATV), motorcycles, farm equipment, boats, airplanes, etc. By way of example, a motor vehicle includes a vehicle body with external vehicle structure. External vehicle structure may comprise, for instance, an outer fascia panel, an engine hood, a trunk lid, a lift gate, a front grille, or any combination thereof. The vehicle emblem includes a bezel that is mounted, e.g., via snap-fastening brackets, to the external vehicle structure. A rigid backing is seated within and attached to the bezel, e.g., via heat stakes. This rigid backing includes one or more depressions and/or one or more ribs. A cover sheet sits against and is attached to the rigid backing, e.g., via a resin bond. The cover sheet includes a transparent layer or film with a color print on the layer/film. Like the rigid backing, the cover sheet includes one or more depressions and/or one or more ribs. Each of the cover sheet's depressions is seated inside at least one of the rigid backing's depressions, while each of the rigid backing's ribs is seated inside at least one of the cover sheet's ribs.

Other aspects of the present disclosure are directed to methods of using and methods of manufacturing a vehicle emblem for a motor vehicle. A method of manufacturing a vehicle emblem includes: placing, in a forming apparatus (e.g., a plastic thermoforming machine), a cover sheet that includes a transparent layer/film with a color print on the transparent layer/film; forming, via the forming apparatus in the cover sheet, one or more sheet depressions and one or more sheet ribs; forming, e.g., via injection molding, a rigid backing against the cover sheet, the rigid backing including one or more backing depressions and one or more backing ribs, each of the sheet depressions being seated inside one of the backing depressions, and each of the backing ribs being seated inside one of the sheet ribs; and, attaching the rigid backing and the cover sheet to a bezel that is configured to mount to an automobile's vehicle structure.

The above summary is not intended to represent every embodiment or every aspect of the present disclosure. Rather, the foregoing summary merely provides an exemplification of some of the novel aspects and features set forth herein. The above features and advantages, and other features and advantages of the present disclosure, will be readily apparent from the following detailed description of the exemplary embodiments and modes for carrying out the present disclosure when taken in connection with the accompanying drawings and appended claims.

BRIEF DESCRIPTION OF THE DRAWINGS

FIG. 1 is a front perspective-view illustration of a representative automobile with a radar transparent vehicle emblem, shown enlarged in the inset view, in accordance with aspects of the present disclosure.

FIG. 2 is a side-view illustration of the exemplary vehicle emblem of FIG. 1 taken in cross-section along line 2-2.

Figure 3:
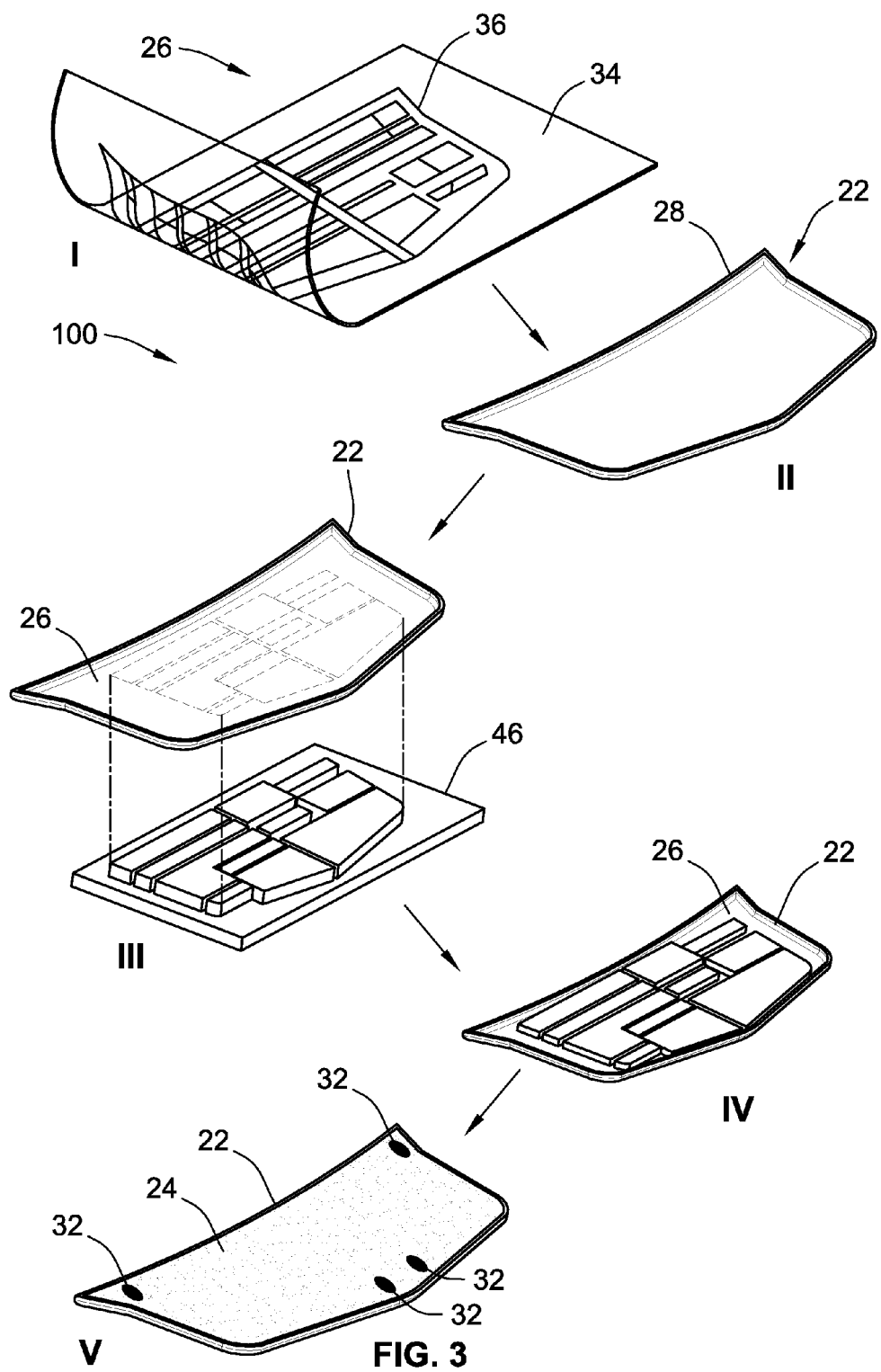
FIG. 3 is a work-flow diagram illustrating a representative method of manufacturing a radar transparent vehicle emblem in accordance with aspects of the present disclosure.

While aspects of this disclosure are susceptible to various modifications and alternative forms, representative embodiments are shown by way of example in the drawings and will be described in detail herein. It should be understood, however, that the inventive aspects of this disclosure are not limited to the particular forms disclosed. Rather, the disclosure is to cover all modifications, equivalents, combinations, subcombinations, and alternatives falling within the spirit and scope of the disclosure as defined by the appended claims.

DETAILED DESCRIPTION OF THE ILLUSTRATED EMBODIMENTS

This disclosure is susceptible of embodiment in many different forms. There are shown in the drawings and will herein be described in detail representative embodiments of the disclosure with the understanding that the present disclosure is to be considered as an exemplification of the principles of the disclosure and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference or otherwise. For purposes of the present detailed description, unless specifically disclaimed: the singular includes the plural and vice versa; the words "and" and "or" shall be both conjunctive and disjunctive; the word "all" means "any and all"; the word "any" means "any and all"; and the words "including" and "comprising" mean "including without limitation." Moreover, words of approximation, such as "about," "almost," "substantially," "approximately," and the like, can be used herein in the sense of "at, near, or nearly at," or "within 3-5% of," or "within acceptable manufacturing tolerances," or any logical combination thereof, for example.

Referring now to the drawings, wherein like reference numbers refer to like components throughout the several views, there is shown in FIG. 1 a front-view illustration of a representative automobile, identified generally as 10, in accordance with aspects of the present disclosure. Mounted at a central portion on the forward-facing surface of the automobile's front grille 14 is a vehicle emblem 12, which is presented in an exemplary form as a "grille badge" that designates the make of the automobile 10. The automobile 10—also referred to herein as "motor vehicle" or "vehicle" for short—is merely an exemplary application with which the inventive aspects of this disclosure can be practiced. In the same vein, the aesthetic design of the vehicle emblem 12, shown in FIG. 1 as the official crest of the CADILLAC® brand of cars, should also be appreciated as an exemplary application of the inventive concepts disclosed herein. As such, it should be understood that the inventive features of the present disclosure can be integrated into other emblem designs and utilized for any type of motor vehicle. Moreover, the external vehicle structure to which the vehicle emblem 12 is mounted is not limited to the front grille 14; rather, the vehicle emblem 12 can be operatively coupled to other portions of the automobile 10, including any of the outer fascia panels 16, the engine hood 18, the trunk lid (not visible in the view provided), etc. Lastly, the drawings presented herein, are not necessarily to scale and are provided purely for instructional purposes. Thus, the specific and relative dimensions shown in the drawings are not to be considered limiting.

Vehicle emblem 12 functions in cooperation with an object-detection device, shown schematically at 20 in FIG. 1, which is disposed at least partially behind the grille 14 and emblem 12 relative to a forward end of the subject automobile 10. While the object-detection device 20 may take on various forms, including laser, infrared, and video, the illustrated example comprises an on-board single-sensor or multi-sensor radar array that operates in conjunction with a computer-automated vehicle control system, such as Adaptive Cruise Control or Collision Avoidance Systems. This object-detection device 20 is adapted to emit an electromagnetic radio wave or signal (e.g., with frequencies from about 300 GHz to as low as about 3 kHz) forward of the grille 12 from an antenna provided in a front surface of a transmit radar sensor (or "transmitter"). A receive radar sensor (or "receiver") is adapted to receive and process the wave after being reflected from a forward detected object, such as a vehicle located ahead of the subject vehicle, thereby determining a distance, an angle and/or a velocity of the object. The vehicle emblem 12 is engineered, as described below, as a radar-transparent jewel-like badge with a multi-colored and multi-dimensional A-surface through which the emitted and/or received radar signals are readily transmitted without significant attenuation.

The representative vehicle emblem 12 illustrated in FIGS. 1 and 2 is a tripartite construction comprising three main components: a mounting bezel 22, a rigid lens backing 24, and a "printed film" cover sheet 26. In at least some embodiments, the emblem 12 is a unitary structure consisting essentially or solely of these three components. The representative bezel 22 is shown with a crest-shaped outer rim 28 (FIG. 3(II)) that is continuous or substantially continuous in form to circumscribe or otherwise frame the rigid backing 24 and cover sheet 26. Mounting bezel 22 is configured to mount the vehicle emblem 12 to the vehicle structure. By way of non-limiting example, the bezel 22 includes one or more fastening members, such as first and second snap-fastening brackets 30 (only one of which is visible in FIG. 1), that project rearwardly from laterally opposing sides of the rim 28. These snap-fastening brackets 30, through cooperation with mating pockets, mechanically couple to complementary portions of the automobile's front grille 14.

It should be appreciated that the bezel 22 may be configured in other shapes and sizes to define the outer perimeter housing of other vehicle emblem designs. Moreover, the bezel 22 may utilize other means of attachment, such as screw-fixed brackets, anchors, adhesives, epoxies, etc., to operatively couple to the vehicle structure. Depending, for example, on design requirements or cost constraints, the bezel 22 may be fabricated from an ornamental material, such as a chrome-coated plastic or painted polymer, or may be fabricated from a more robust and resilient metallic material, such as chromed steel or aluminum.

Seated within a central opening of the mounting bezel 22 is the rigid lens backing 24. According to the illustrated example, the outer periphery of the rigid backing 24 is generally coterminous with the inner periphery of the crest-shaped outer rim 28 of the bezel 22. Fabricating the rigid backing 24 in this manner with a complementary crest-shaped periphery allows the backing 24 to nest flush within the outer rim 28 such that there are no readily visible gaps between the bezel 22 and backing 24, as best seen in FIG. 3(V). Similar to the bezel 22, the rigid backing 24 may be configured in alternative shapes and sizes to replicate other vehicle emblem designs.

Rigid lens backing 24 is configured to provide structural support for the flexible cover sheet 26. Depending, for example, on design parameters, the backing lens 24 may be fabricated from an injection molded transparent material (e.g., acrylic) or non-transparent material (e.g., acrylonitrile butadiene styrene (ABS)), or any other rigid or semi-rigid material suitable for the intended application of the vehicle emblem 12. Once properly seated within the outer rim 28, the rigid backing 24 and cover sheet 26 (collectively referred to herein as the "lens"), are mechanically coupled to the bezel 22, for example, via one or more heat stakes 32. It is contemplated that the vehicle emblem 12 utilize other means of attachment, such as adhesives, overmolding, fasteners, flexible bezel tabs, etc., for operatively coupling the backing 24 to the bezel 22.

According to the illustrated example, the "printed film" cover sheet 26 is laid against and attached to the forward-facing outer surface of the rigid backing 24. For at least some embodiments, the cover sheet 26 and rigid backing 24 are coupled together, e.g., to form the sheet-and-backing "lens" unit, via a resin bond. Alternative designs may implement an interference fit, adhesives, or other forms of attachment to operatively couple the cover sheet 26 to the backing 24. As best seen in FIG. 2, this flexible sheet 26 can extend continuously across and cover the entire forward-facing outer surface of the backing 24. In so doing, when the vehicle emblem 12 is mounted to the automobile's front grille 14, the backing 24 is substantially or completely concealed from pedestrian view forward of the vehicle 10.

With reference to FIG. 3(I), the cover sheet 26 comprises a substantially or completely transparent layer or film 34 that carries, for example, on an inside surface thereof a multi-color print 36. While the film 34 and print 36 can be fabricated from an assortment of materials using a variety of methods, the illustrated embodiment utilizes a polycarbonate (PC) or polyethylene terephthalate (PET) film with a computer-aided digital or screen printed color logo. This color print 36, which is illustrated as the logo for the CADILLAC® motor car division of luxury vehicles, can be modified to portray any vehicle make, model, version and/or other desired information. It is the exterior non-print-side surface of the transparent layer 24 that operates as the forward-most show surface (or "A-surface") of the vehicle emblem 12.

As indicated above, the vehicle emblem 12 provides a jewel-like grille badge with a multi-dimensional A-surface. By way of explanation, and not limitation, the rigid backing 24 includes one or more "backing" depressions 38 recessed into a forward surface thereof and/or one or more "backing" ribs 40 protruding from the forward surface thereof. In accord with the illustrated embodiment, the rigid backing 24 is fabricated with an assortment of distinctly shaped and sized backing depressions 38 interleaved with an assortment of distinctly shaped and sized backing ribs 40. Likewise, the cover sheet 26 includes one or more "sheet" depressions 42 recessed into a forward surface thereof and/or one or more "sheet" ribs 44 protruding from the forward surface thereof. Akin to the rigid backing 24, the representative cover sheet 26 of FIG. 2 is fabricated with an assortment of distinctly shaped and sized sheet depressions 42 interleaved with an assortment of distinctly shaped and sized sheet ribs 44. It should be readily appreciated that the number, shapes, and/or sizes of the backing depressions 38, backing ribs 40, sheet depressions 42 and sheet ribs 44 can be varied, singly and in any combination, from that which is illustrated in the drawings. In the same vein, the ribs and depressions can be substantially identical in shape, size and/or number. Moreover, it is envisioned that the vehicle emblem 12 comprises other three-dimensional (3D) shapes.

With continuing reference to FIG. 2, each of the cover sheet's depressions 42 is seated inside at least one of the rigid backing's depressions 38. Likewise, each of the rigid backing's ribs 40 is seated inside at least one of the cover sheet's ribs 44. It is desirable, for at least some embodiments, that each sheet depression 42 be seated flush inside a single respective one of the backing depressions 38 which has a complementary size and shape such that these depressions nest conterminously with one another. It is further desirable, for at least some embodiments, that each backing rib 40 be seated flush inside a single respective one of the sheet ribs 44 which has a complementary size and shape such that these ribs nest conterminously with one another.

The vehicle emblem 12 can take on various combinations of lengths, heights, and depths. In some instances, the vehicle emblem 12—i.e., the assembled bezel 22, rigid backing 24 and cover sheet 26—has a maximum total assembly thickness of between about 4 mm to about 8 mm and, in some instances, between about 5 mm to about 7.5 mm and, in some instances, approximately 7.2 mm. Moreover, to ensure sufficient radar transparency such that radar signal attenuation does not inadvertently impede operation of an on-board active vehicle control system, each of the backing ribs 40 and sheet ribs 44 has a maximum rib height of approximately 1 mm or less. In the same vein, to ensure sufficient radar transparency, each of the backing depressions 38 and sheet depressions 42 has a maximum depression depth of approximately 2 mm or less and, in some instances, about 1 mm or less. As can be seen from the cross-sectional side-view illustration of FIG. 2, a total thickness of the vehicle emblem 12 varies along a height thereof due to the inclusion of the various ribs and depressions.

With reference now to the work-flow diagram of FIG. 3, an improved method of manufacturing a vehicle emblem, such as the vehicle emblem 12 of FIGS. 1 and 2, for an automobile, such as automobile 10 of FIG. 1, is generally described at 100 in accordance with aspects of the present disclosure. This assembly and work flow process will be described with reference to the various configurations and features shown in FIGS. 1 and 2 of the drawings; such reference is being provided purely by way of explanation and clarification. The method 100 starts at FIG. 3(I) with the fabrication of the cover sheet 26 segment of the vehicle emblem 12. As indicated above, this may comprise printing or otherwise applying a printed logo 36 onto a transparent layer or film 34. In processes where an outside vendor generates the cover sheet 26, this particular step can merely require receiving and/or prepping the cover sheet 26 for integration into the vehicle emblem assembly 12.

The method 100 continues to FIG. 3(II) with the fabrication of the mounting bezel 22 segment of the vehicle emblem 12. As indicated above, the bezel 22 may be fabricated from an ornamental material, such as a chrome-coated plastic. In processes where an outside vendor generates the bezel 22, this particular step can merely require receiving and/or prepping the bezel 22 for integration into the vehicle emblem assembly 12. Method 100 then requires placing the cover sheet 26 in a forming apparatus, which is represented herein by a thermoforming mold 46 of a thermoforming apparatus of FIG. 3(III). Once properly situated, one or more sheet depressions 42 and one or more sheet ribs 44 are thermoformed in the cover sheet 26 via the forming apparatus 46, as seen in FIG. 3(IV). The cover sheet 26 is then cut to size.

The method 100 continues to FIG. 3(V) with the forming of a rigid backing 24 against the cover sheet 26. In at least some embodiments, the rigid backing 24 is formed from a thermoset polymeric material via an injection molding process. During this step, the cover sheet 26 may be inserted into the injection molding apparatus such that the cover sheet 26 is attached to the rigid backing 24 during the forming of the backing 24 via a resin bond. In so doing, the rigid backing 24 will be generated with one or more backing depressions 38, each of which seats therein a corresponding sheet depression 40, and one or more backing ribs 40, each of which seats inside one of the sheet ribs 44. Finally, the rigid backing 24 and cover sheet 26 is attached to the bezel 22 e.g., via heat staking.

In some embodiments, the method 100 includes at least those steps shown in FIG. 3 and/or those steps enumerated above. It is also within the scope and spirit of the present disclosure to omit steps, include additional steps, and/or modify the order presented herein. It should be further noted that the foregoing method can be representative of a single sequence of related steps; however, it is expected that the method will be practiced in a systematic and repetitive manner to generate multiple vehicle emblems.

While aspects of the present disclosure have been described in detail with reference to the illustrated embodiments, those skilled in the art will recognize that many changes may be made thereto without departing from the scope of the present disclosure. The present disclosure is not limited to the precise construction and compositions disclosed herein; any and all modifications, changes, and variations apparent from the foregoing descriptions are within the spirit and scope of the disclosure as defined in the appended claims. Moreover, the present concepts expressly include any and all combinations and subcombinations of the preceding elements and aspects.

What is claimed:

1. A vehicle emblem for a motor vehicle having vehicle structure, the vehicle emblem comprising:
   a bezel configured to mount the vehicle emblem to the vehicle structure;
   a rigid backing seated within and attached to the bezel, the rigid backing including a plurality of backing depressions and a plurality of backing ribs; and
   a cover sheet laid against and attached to the rigid backing, the cover sheet including a transparent layer with a color print on the transparent layer, the cover sheet including a plurality of sheet depressions and a plurality of sheet ribs formed in the transparent layer, wherein each of the sheet depressions of the cover sheet is seated inside at least one of the backing depressions of the rigid backing, and each of the backing ribs is seated inside at least one of the sheet ribs.

2. The vehicle emblem of claim 1, wherein the bezel includes an outer rim with one or more fastening members projecting from the outer rim, the one or more fastening members being configured to mechanically couple to the vehicle structure.

3. The vehicle emblem of claim 1, wherein the bezel includes a continuous outer rim circumscribing the rigid backing and the cover sheet.

4. The vehicle emblem of claim 1, wherein the rigid backing is attached to the bezel via one or more heat stakes.

5. The vehicle emblem of claim 1, wherein the cover sheet extends continuously across and covers an outer surface of the rigid backing.

6. The vehicle emblem of claim 1, wherein the cover sheet is attached to the rigid backing via a resin bond.

7. The vehicle emblem of claim 1, wherein the plurality of backing depressions includes a plurality of distinctly sized backing depressions, and the plurality of sheet depressions includes a plurality of distinctly sized sheet depressions, each of the sheet depressions being seated inside a respective one of the backing depressions with a complementary size.

8. The vehicle emblem of claim 1, wherein the plurality of backing ribs includes a plurality of distinctly sized backing ribs, and the plurality of sheet ribs includes a plurality of distinctly sized sheet ribs, each of the backing ribs being seated inside a respective one of the sheet ribs with a complementary size.

9. The vehicle emblem of claim 1, wherein the bezel, rigid backing and cover sheet have a total thickness of between about 4 mm to about 8 mm.

10. The vehicle emblem of claim 1, wherein the cover sheet has a substantially uniform thickness.

11. The vehicle emblem of claim 1, wherein each of the sheet depressions and each of the backing depressions has a depth of approximately 1 mm or less, and each of the sheet ribs and each of the backing ribs has a height of approximately 2 mm or less.

12. The vehicle emblem of claim 1, wherein a total thickness of the vehicle emblem varies along a height thereof.

13. A motor vehicle, comprising:
   a vehicle body with external vehicle structure, the external vehicle structure including an outer fascia panel, an engine hood, a trunk lid, or a front grille, or any combination thereof; and
   a vehicle emblem, including:
      a bezel mounted to the external vehicle structure;
      a rigid backing seated within and attached to the bezel, the rigid backing including a plurality of laterally and longitudinally spaced backing depressions interleaved with a plurality of laterally and longitudinally spaced backing ribs; and
      a cover sheet laid against and attached to the rigid backing, the cover sheet including a transparent layer with a color print on the transparent layer, the cover sheet including a plurality of laterally and longitudinally spaced sheet depressions interleaved with a plurality of laterally and longitudinally spaced sheet ribs formed in the transparent layer,
wherein each of the sheet depressions of the cover sheet is seated inside at least one of the backing depressions of the rigid backing, and each of the backing ribs is seated inside at least one of the sheet ribs.

14. A method of manufacturing a vehicle emblem for a motor vehicle having vehicle structure, the method comprising:
placing, in a forming apparatus, a cover sheet including a transparent layer with a color print on the transparent layer;
forming, in the cover sheet via the forming apparatus, one or more sheet depressions and one or more sheet ribs;
forming a rigid backing against the cover sheet, the rigid backing including one or more backing depressions and one or more backing ribs, each of the sheet depressions being seated inside one of the backing depressions, and each of the backing ribs being seated inside one of the sheet ribs; and
attaching the rigid backing and the cover sheet to a bezel configured to mount to the vehicle structure.

15. The method of claim 14, wherein the one or more sheet depressions and the one or more sheet ribs are formed in the cover sheet via thermoforming.

16. The method of claim 14, wherein the rigid backing is formed via injection molding.

17. The method of claim 14, wherein the rigid backing is attached to the bezel via heat staking.

18. The method of claim 14, wherein the cover sheet is attached to the rigid backing during the forming of the rigid backing via a resin bond.

19. The method of claim 14, wherein the bezel includes a continuous rim with one or more fastening members projecting from the continuous rim, the one or more fastening members being configured to mechanically couple to the vehicle structure.

20. The method of claim 14, wherein the vehicle emblem, once assembled, has a total thickness which varies along a height thereof.

* * * * *